Figure 1:
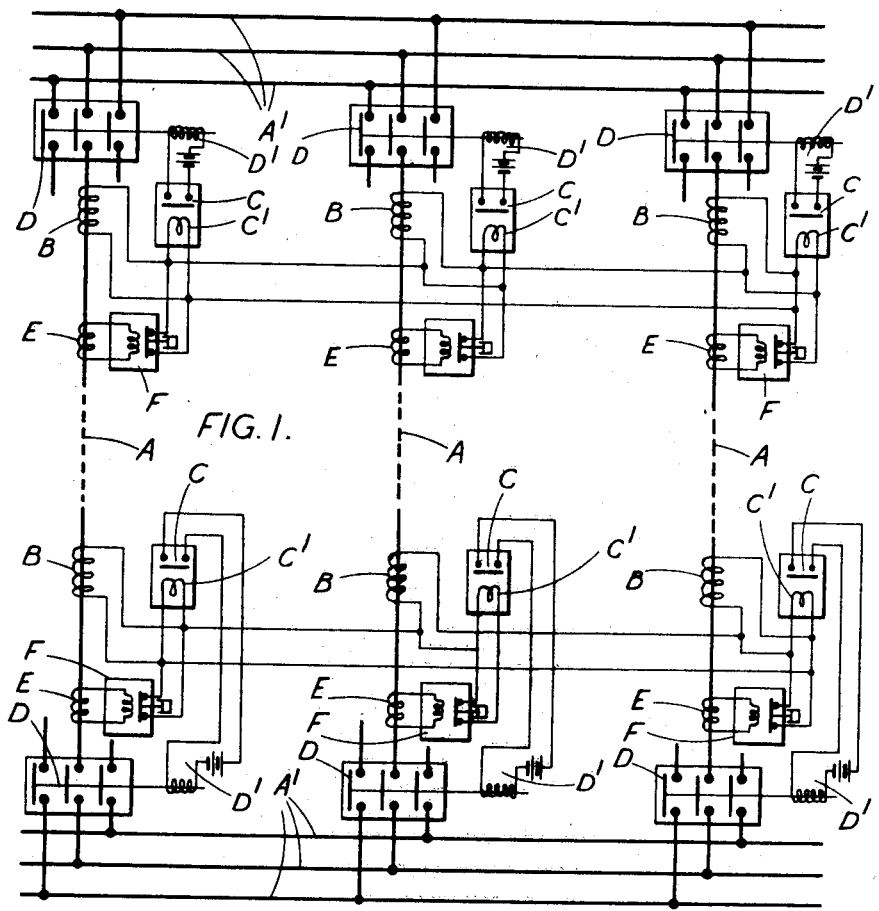

July 15, 1930.   C. C. GALLOP ET AL   1,770,398
ELECTRIC PROTECTIVE SYSTEM
Filed July 2, 1928   2 Sheets-Sheet 1

Charles Clayton Gallop
Geoffrey Harold Gardner
INVENTORS

Watson, Coit, Morse & Grindle
ATTORNEYS

Patented July 15, 1930

1,770,398

UNITED STATES PATENT OFFICE

CHARLES CLAYTON GALLOP, OF NEWCASTLE-UPON-TYNE, AND GEOFFREY HAROLD GARDNER, OF LEEDS, ENGLAND, ASSIGNORS TO A. REYROLLE & COMPANY LIMITED, OF HEBBURN-ON-TYNE, ENGLAND, A COMPANY OF GREAT BRITAIN

ELECTRIC PROTECTIVE SYSTEM

Application filed July 2, 1928, Serial No. 289,981, and in Great Britain August 29, 1927.

This invention relates to electric protective systems. In many such systems difficulties have arisen owing to the inadvertent operation of the protective relay or relays, when switching operations are being performed in the main protected circuit. This inadvertent operation is due either to the disturbance of an existing balance in the secondary circuits of the protective system or to surges of a transient nature which may result for instance from the charging current of a protected transformer or line or from the impossibility of ensuring absolute simultaneity in the closing of the various contacts when a section of the main circuit is being switched in. These difficulties are usually met by electrically or mechanically cutting the protective system out of operation during switching operations or by increasing the setting of the protective relays to such a value that they remain inoperative during switching surges, or by introducing a permanent time-lag into the protective system.

The present invention has for its object to provide means whereby the inadvertent operation due to switching surges or operations is prevented, without introducing high relay settings or permanent time-lags into the system, at the same time leaving the protective relay or relays always ready for operation in the event of a fault.

In the electric protective system according to the invention one or more auxiliary relays whose operation depends upon the conditions in the main protected circuit are provided in association with a protective relay, such auxiliary relay or relays acting to render the protective relay inoperative or ineffective during switching operations in the main circuit so long as the current in that circuit is below a predetermined value. Thus the system may comprise a protective relay controlling a tripping circuit for a circuit-breaker in the main protected circuit, and an auxiliary relay energized from a current transformer in the main protected circuit and acting to prevent the protective relay from tripping the circuit-breaker after the circuit-breaker has been closed until a current of a predetermined value has been flowing in the protected circuit for a predetermined time. This may be accomplished by so arranging the auxiliary relay that its contacts before operation either short-circuit the protective relay or directly control the tripping circuit of the circuit-breaker.

The invention may be applied to protective systems of various kinds. Thus in the case of a protective system for a single unit, such as a feeder or transformer or electrical machine, the application of the invention thereto will serve to prevent incorrect operation of the protective gear when the unit is being switched into circuit. For instance, even though the unit is sound, it might otherwise be tripped out again immediately as the result of a switching surge, caused, say, by the closure of the contacts in one phase shortly before those in another phase or by the charging current of the protected apparatus. The auxiliary relay according to the invention will however hold the protective gear inoperative for a short time sufficient to allow the switching surge to have fallen to a value too small to operate the gear. On the other hand, if the unit to be switched in is faulty, the auxiliary relay will be operated by the fault current and the protective gear will thus be available to trip the unit out again.

In the case of a protective system common to a group of units, such as a group of parallel feeders, an arrangement according to the invention will not merely serve to ensure correct operation of the part of the protective system associated with the particular unit to be switched in or out, but will also serve to render the remainder of the protective system unaffected by the switching operation and still available for use in the event of a fault simultaneously occurring on another unit.

Figure 2:
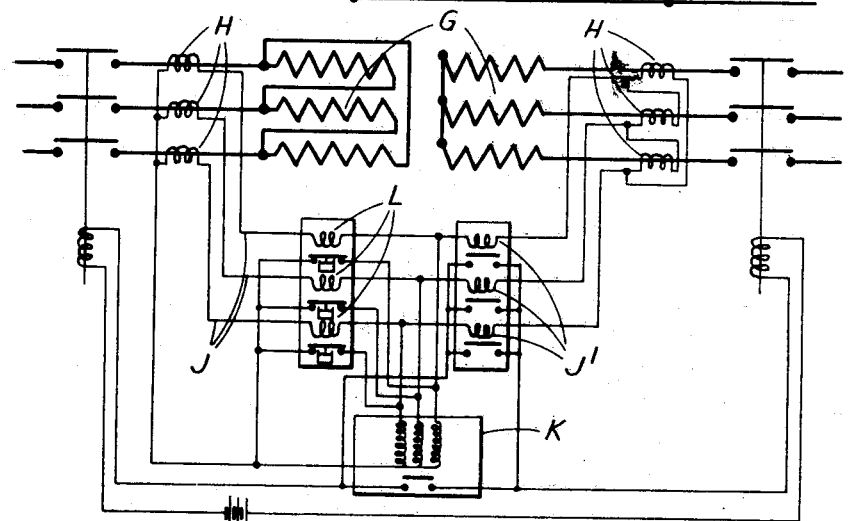
Figure 3:
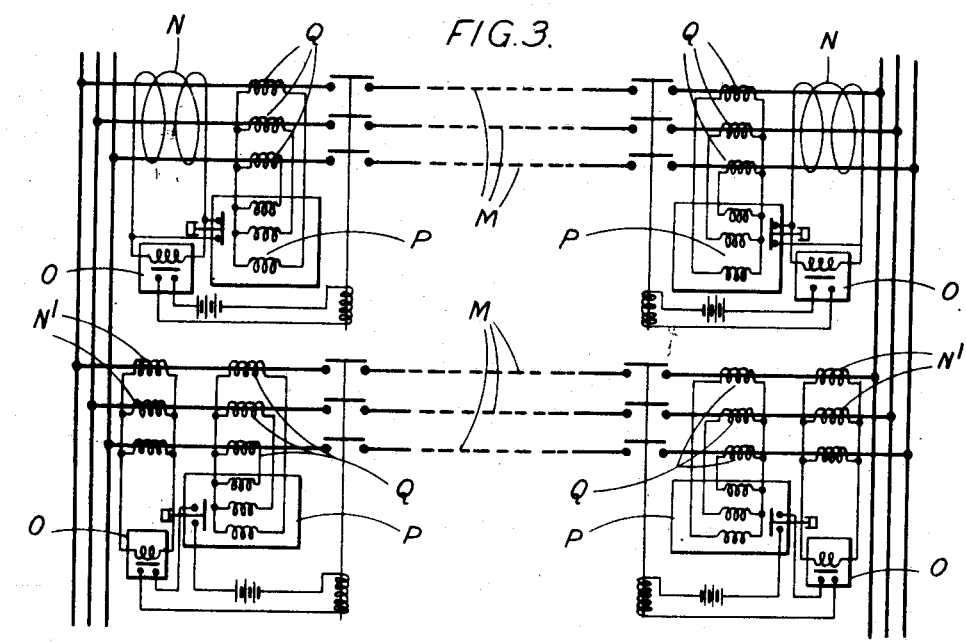
Figure 4:
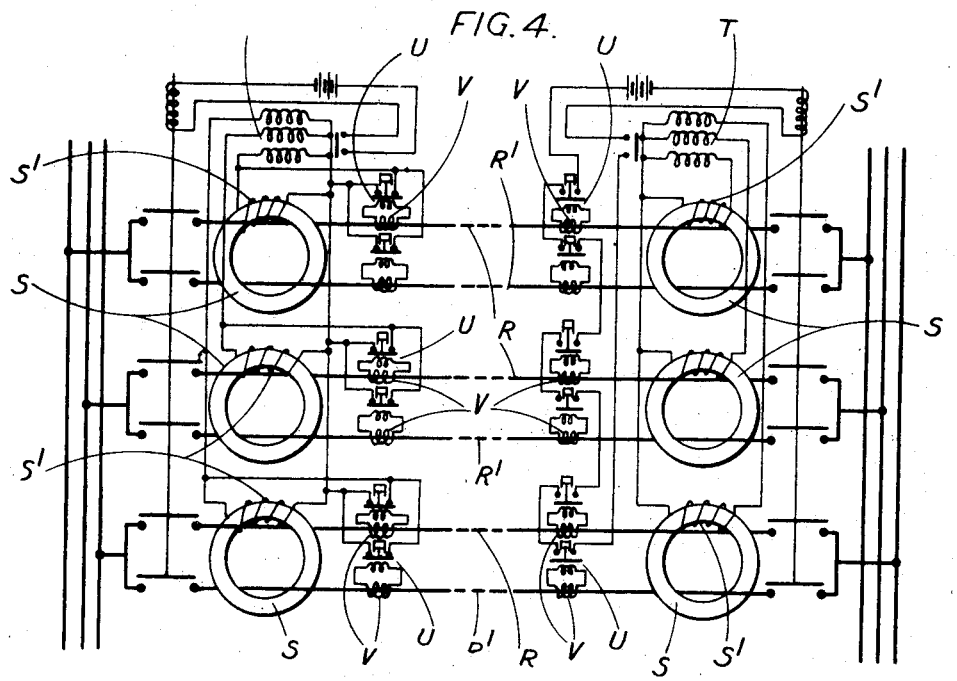

The accompanying drawings illustrate by way of example some convenient practical arrangements in which the invention is applied respectfully to some typical known forms of protective system. In these drawings Figure 1 shows the application of the invention to a well known current-balance system of protection for a group of parallel feeders, Figure 2 illustrates the application to a Merz-Price current-balance system of protection for a power transformer, Figure 3 shows the application to a core-balance system of protection, and Figure 4 shows the application to a split conductor system of protection.

In the arrangement of Figure 1 the invention is applied to a current-balance system of protection for a group of feeders A connected in parallel between two sets of three-phase busbars $A^1$, only one phase of each feeder being shown in the drawings. In the known system current transformers B are provided on the feeders A at both ends, and at each end of the system all the current transformer secondaries in each phase are connected in series with one another. Across each secondary B is shunted the current coil $C^1$ of a directional relay C, which controls the tripping circuit $D^1$ for a circuit-breaker D in the feeder, the potential coils of the relays C being omitted from the drawings for the sake of clearness. Under normal conditions a current circulates through the transformer secondaries B leaving the relays C unaffected. Under fault conditions an excess current will flow in the secondary circuits and will affect the relays C, but in only one group of relays (namely those associated with the faulty feeder) will the direction of such excess current be such as to cause the operation of the relays. Thus the faulty feeder is cut out leaving the sound feeders in circuit. The tripping of a circuit-breaker D is usually arranged to short-circuit the corresponding relays C and transformer secondaries B in order to ensure the correct maintenance of the current balance in the secondary circuits for the remaining feeders. This system in its simple form has the disadvantage that when an additional feeder is switched into circuit, the unavoidable closing of the circuit-breaker at one end before that at the other end may cause either the new feeder or all the feeders already on load to be automatically tripped out, a similar effect sometimes also being produced when a feeder is being switched out of circuit. These difficulties are usually overcome either by cutting out of operation that part of the protective system on which switching operations are taking place, or by adjusting the setting of the time-lag of the protective relays so that they will not operate on switching surges or while switching operations are being performed. These remedies, however, necessarily introduce other serious disadvantages. The difficulties can be overcome, however, without introducing such disadvantages, by the employment of an arrangement according to the present invention, as will now be described.

For this purpose each phase of each feeder A at each end is provided with a current transformer E which serves to energize an auxiliary relay F. As shown in the upper half of Figure 1, the contacts of each auxiliary relay F are normally closed, when the corresponding circuit-breaker D is open, and act to short-circuit the corresponding protective relay C. The auxiliary relays F are set to operate their contacts when the current in the feeder A has reached a predetermined value, and as soon as the relays F operate, the current transformers B and protective relays C associated with the particular feeder are connected into the secondary circuits. Thus, if the feeder to be switched in is sound, the auxiliary relays F will not operate until the circuit-breakers D at both ends have closed and the current has reached a predetermined value, which may be say 10% of the normal value. On the other hand, if the feeder should happen to be faulty, the flow of fault current due to the closing of one circuit-breaker D will at once operate the auxiliary relays F and bring the protective gear into action to cut the feeder out again. In order to avoid troubles due to the too early operation of the auxiliary relays resulting from the charging current of the line, it is desirable to provide these relays with a small time-lag. Thus the part of the protective gear associated with the feeder to be switched in cannot be put into commission (except when the feeder is faulty) until all switching surges have fallen to an inoperative value, and the remainder of the protective gear is consequently left unaffected by the switching operations.

The arrangement of Figure 2, which shows the application of the invention to a Merz-Price current-balance system of protection for a power transformer, will now be described. In this known system as applied to a three-phase star-delta connected transformer G, current transformers H are provided on the various phases on both sides of the transformer, the secondaries on the star side being connected in delta and those on the delta side being connected in star, the corresponding points of the two groups of secondaries being connected together through pilot wires J, to which the star-connected coils of a three-phase protective relay K are connected, overload relays $J^1$ being provided in the pilot wires J. When the invention is applied to this system, three auxiliary relays L are provided with their coils in series with the three pilot wires J, their contacts normally acting to short-circuit the coils of the protective relay K. Thus when the power transformer G is to be switched into circuit, the protective relay K will be held inoperative until the current flowing through the pilot wires J (which is a measure of the current flowing in the main circuit) has reached a predetermined value, the auxiliary relays L being fitted with time-lags to ensure that the switching surges will have fallen to a safe value before the protective relay K is put into commission. Once the auxiliary relays L have operated, however, the normal protection is available without a time-lag. In the arrangement illustrated the contacts of the auxiliary relays L normally short-circuit the coils of the protective relay K, but a similar result can be obtained if the contacts of the auxiliary relays L are normally open and are connected in series with the contacts of the relay K to control the tripping circuit.

Another application of the invention is to what is known as a core-balance system of protection for a feeder or a group of parallel feeders. In the arrangement of Figure 3 the invention is shown as applied to a group of two parallel feeders M, two alternative arrangements being shown respectively on the two feeders. In the known system at each end the three phase-conductors of each feeder are either all passed through the core of a current transformer whose secondary N operates a protective relay O (as shown on the upper feeder), or are each provided with a separate current transformer, the secondaries $N^1$ of the three transformers being connected in parallel to operate the protective relay O (as shown on the lower feeder). Thus the protective relay O is inoperative so long as the algebraical sum of the currents flowing in the main phase-conductors is zero, and the system will give protection against earth faults. It will be clear that, when the feeder is being switched in, the protective relays O may be caused to operate if the contacts in the various phases do not close exactly simultaneously or as the result of unbalanced charging currents. This is prevented according to the invention by providing auxiliary relays P energized from current transformers Q in the feeder, the relays P acting either to open short-circuits across the protective relays O (as shown on the upper feeder) or to close contacts in the tripping circuits controlled by the relays O (as shown on the lower feeder). The auxiliary relays P are set to operate their contacts when the current in the feeder has reached a predetermined value, say ten per cent of the full load current, and are provided with time-lags to ensure that the switching surges will have fallen to a safe value before the protective relays O are put into commission.

Figure 4 shows a further application of the invention to what is known as the split conductor system of protection, wherein two conductors R $R^1$ in parallel are employed in each phase instead of a single conductor and at each end these two conductors are differentially passed through or wound on the core of a current transformer S, whose secondary S' operates a protective relay T. With this system inadvertent operation of the protective relays may occur during switching operations, as the result of the contact in one split conductor closing before that in the other. This is avoided according to the invention by providing a time-lag auxiliary relay U which is energized from a current transformer V in each conductor R $R^1$ of the main circuit and acts to short-circuit the protective relays T until a predetermined current has been flowing in the protected circuit for a predetermined time, normal protection being available as soon as the auxiliary relay U has operated. The right-hand end of the figure shows a modification in which the auxiliary relays U, instead of short-circuiting the coils of the protective relays T, control contacts in series with the tripping circuits operated thereby.

It will be appreciated that the arrangements more particularly described have been given by way of example only and may be modified to suit the application to electric protective systems of other kinds.

What we claim as our invention and desire to secure by Letters Patent is:

1. In an electric protective system, the combination of a protective relay, at least one auxiliary relay whose operation is dependent upon the conditions in the main protected circuit, and means whereby such auxiliary relay acts to render the protective relay inoperative or ineffective during switching operations in the main circuit so long as the current in that circuit is below a predetermined value.

2. In an electric protective system, the combination of a circuit-breaker in the protected circuit, a tripping circuit therefor, a protective relay controlling such tripping circuit, a current transformer in the main protected circuit, an auxiliary relay energized from the current transformer, and means whereby the auxiliary relay prevents the protective relay from tripping the circuit-breaker after the circuit-breaker has been closed until a current greater than a predetermined value has been flowing in the protected circuit for a predetermined time.

3. In an electric protective system, the combination of a normally short-circuited protective relay, an auxiliary relay whose operation is dependent upon the conditions in the main protected circuit, and means whereby such auxiliary relay acts to remove the short-circuit from the protective relay when a current of a predetermined value has been flowing in the protected circuit for a predetermined time.

4. In an electric protective system for a group of parallel feeders, the combination at each end of the feeders of current transformers in the feeders having their secondaries connected in series with one another, protective relays associated with the individual feeders and so connected across the current transformer secondary circuit as to be normally inoperative, and an auxiliary relay associated with each protective relay and acting to short-circuit that relay when the corresponding feeder is out of circuit and to hold the relay short-circuited after the feeder is switched into circuit until the current conditions in the feeder are such as to allow the short-circuit to be removed without disturbing the normal current balance in the secondary circuit.

5. In an electric protective system for a group of parallel feeders, the combination at each end of the feeders of protective current transformers in the feeders having interacting secondary circuits, protective relays associated with the individual feeders and so connected to the current transformers secondary circuits as to be normally inoperative, and an auxiliary relay associated with each protective relay and acting to hold that relay inoperative or ineffective during switching operations in the corresponding feeder until the current flowing in the feeder reaches a predetermined value.

6. In an electric protective system for a multiphase feeder of the split conductor type the combination at each end of the feeder of protective current transformers in each phase whose secondary windings are energized when the normal balance between the split conductors of a phase is disturbed, a protective relay associated with each protective current transformer, a current transformer in each split conductor, and an auxiliary relay energized from the current transformer in each split conductor, the auxiliary relays energized from the split conductors of a phase acting to render the protective relay for the phase inoperative or ineffective until the current flowing in both the split conductors reaches a predetermined value.

7. In an electric protective system for a multiphase feeder of the split conductor type the combination at each end of the feeder of protective current transformers in each phase whose secondary windings are energized when the normal balance between the split conductors of a phase is disturbed, a protective relay associated with each protective current transformer, a current transformer in each split conductor, and an auxiliary relay energized from the current transformer in each split conductor, the auxiliary relays energized from the split conductors of a phase acting when deenergized to short-circuit the protective relay for the phase and being energized to remove the short circuit when the current flowing in both the split conductors reaches a predetermined value.

8. In an electric protective system for a multiphase feeder of the split conductor type the combination at each end of the feeders of a circuit-breaker in the protected circuit, a tripping circuit therefor, protective current transformers in each phase whose secondary windings are energized when the normal balance between the split conductors of a phase is disturbed, a protective relay associated with each protective current transformer and controlling the tripping circuit of the circuit-breaker, a current transformer in each split conductor and an auxiliary relay energized from the current transformer in each split conductor, the auxiliary relays energized from the split conductors of a phase acting to render the control of the tripping circuit by the protective relay for the phase inoperative or ineffective until a current greater than a predetermined value has been flowing in both the split conductors for a predetermined time.

9. In an electric protective system for a multiphase feeder of the split conductor type the combination at each end of the feeders of a circuit-breaker in the protected circuit, a tripping circuit therefor, protective current transformers in each phase whose secondary windings are energized when the normal balance between the split conductors of a phase is disturbed, a protective relay associated with the protective current transformers and controlling the tripping circuit of the circuit-breaker, a current transformer in each split conductor, an auxiliary relay energized from the current transformer in each split conductor, and contacts on each auxiliary relay arranged in series in the tripping circuit so that said tripping circuit cannot be completed by the operation of the protective relay unless the auxiliary relay contacts have been operated due to the energization of the auxiliary relay.

In testimony whereof we have signed our names to this specification.

CHARLES CLAYTON GALLOP.
GEOFFREY HAROLD GARDNER.